Aug. 18, 1936.  E. W. DAVIS  2,051,290
LUBRICATING APPARATUS
Filed Jan. 3, 1933
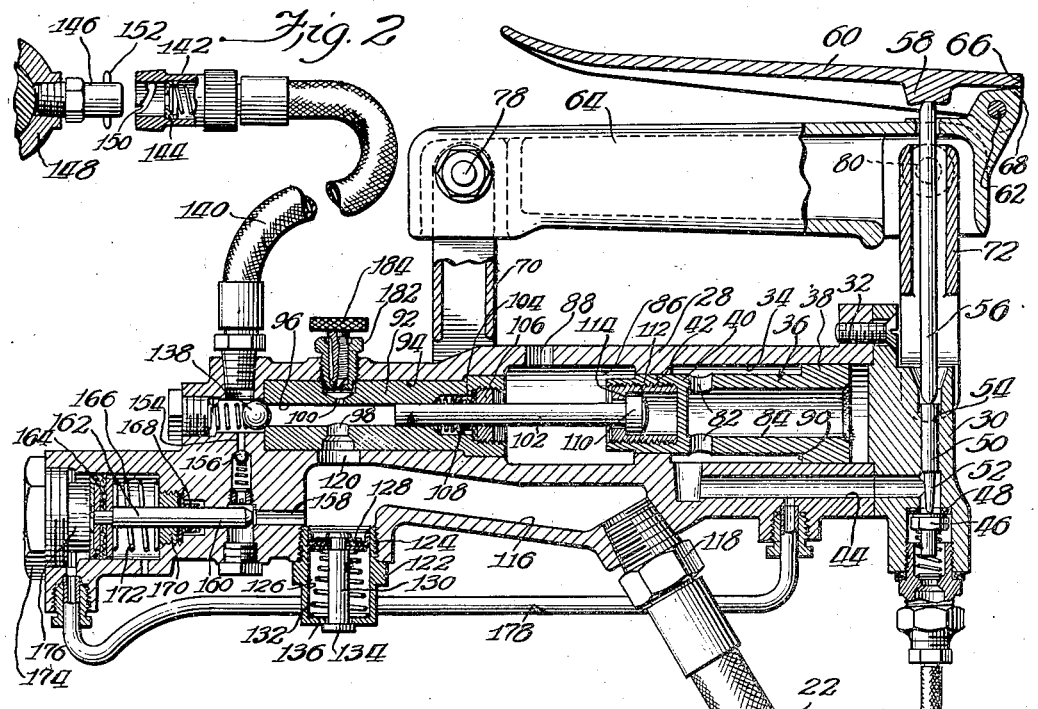
Inventor:
Ernest W. Davis
By Williams, Bradbury, McCaleb & Hinkle
Attys Patented Aug. 18, 1936

2,051,290

UNITED STATES PATENT OFFICE 2,051,290

LUBRICATING APPARATUS

Ernest W. Davis, Oak Park, Ill., assignor, by mesne assignments, to Stewart-Warner Corporation, Chicago, Ill., a corporation of Virginia Application January 3, 1933, Serial No. 649,765

11 Claims. (Cl. 221—47.3)

My invention relates generally to lubricating apparatus and more particularly to improvements in power operated boosters used in high pressure lubricating systems.

In high pressure lubricating systems in which the parts to be lubricated are equipped with lubricant receiving fittings and lubricant is supplied by a compressor which has means for making a quick detachable connection with the lubricant receiving fittings, it is frequently extremely difficult to uncouple the compressor from the fitting when the bearing to which the fitting is attached offers a high resistance to the inflow of lubricant. This is especially true of a system employing the so-called pin fittings and a coupler having bayonet slots for engagement with the projecting ends of the pins of the fittings. In the latter system of high pressure lubrication, the lubricant pressure exerts a force tending to hold the coupler in tight engagement with the fitting. When the operator attempts to remove the coupling the fitting is often turned loose with the coupler, with consequent loss of time.

To overcome this difficulty, it is necessary to provide means in the lubricant compressor for relieving the pressure in the discharge conduit. In the past this has been accomplished by providing a valve controlled vent to the atmosphere which could be opened to permit the escape of sufficient grease from the discharge conduit to reduce the pressure therein and thus make it possible to disengage the coupler from the fitting. This method of relieving the pressure had the disadvantage that a certain quantity of lubricant escaped to the atmosphere each time the vent valve was opened, this grease being wasted and, furthermore, usually adhering to the lubricant compressor, making the latter dirty and difficult to handle.

Another difficulty which has been experienced with high pressure boosters, especially in cold weather, is that the lubricant from the low pressure source failed to flow sufficiently rapidly through the conduit between the source and the booster adequately to prime the high pressure cylinder of the latter. This disadvantage is overcome, in my invention, by the provision of a spring pressed piston operating in a cylinder closely adjacent the inlet port of the high pressure cylinder of the booster and operable to force the lubricant into the high pressure cylinder during the short interval that the inlet port is open, whenever the flow from the low pressure source is not sufficiently rapid fully to prime the high pressure cylinder.

In utilizing compressed air operated boosters in which the discharge stroke of the high pressure plunger is effected by the momentum of an air operated piston, it was found that the reaction of the piston and plunger movement caused high frequency vibration of the booster. This vibration made the operation of this type of booster rapidly tiring to the operator. In the booster of my present invention, this difficulty has been overcome by providing a handle which is connected to the booster by a pair of links in such manner that the vibrations of the latter are not transmitted to the handle.

It is therefore among the objects of my invention to provide an improved high pressure lubricant compressor which is easily operated, which is simple and durable in construction, and which may be economically manufactured.

A further object is to provide an improved booster having a carrying handle connected thereto in such manner as not to have the vibration of the booster transmitted to the handle.

A further object is to provide improved means for insuring positive priming of the high pressure cylinder of a lubricant compressor.

A further object is to provide an improved high pressure compressor in which the lubricant pumping plunger is joined to the actuating member by a lost motion connection, thereby making it possible to develop high pressures to operate more efficiently in cold weather and with high viscosity lubricants.

A further object is to provide an improved automatically operable means to relieve the pressure in the discharge conduit of a lubricant compressor upon discontinuance of its operation.

Other objects will appear from the following description, reference being had to the accompanying drawings, in which—

Figure 1 is a more or less diagrammatic elevational view of a high pressure lubricating system showing how the improved booster of my invention is utilized;

Figure 2 is a central vertical sectional view of the booster.

The booster of my invention is adapted to be used in a high pressure lubricating system of one of the types at present in general use, wherein lubricant is forced from a container at relatively low pressure through conduits leading to the booster. The booster is preferably power operated, usually by compressed air, to discharge the lubricant supplied from the source through a discharge conduit to a bearing to which the conduit is coupled, under very high pressure. A system of this type is illlstrated in Fig. 1, wherein the lubricant container comprises a tank 10 in which the lubricant is maintained under relatively low pressure by compressed air supplied thereto through a conduit 12, the supply of air pressure being controlled by a valve 14. The tank is usually provided with a safety valve 16 and pressure gauge 18 and has a pipe 20 extending through the top thereof to a point adjacent the bottom. The pipe 20 is connected to a lubricant supply hose 22, while an air supply hose 24 is connected to the valve 14. The lubricant supply hose 22 and air supply hose 24 are preferably bound together by a suitable wear resisting covering 26.

The booster comprises a body 28 having a head 30 secured thereto by a plurality of screws 32. The head has an air cylinder bore 34 in which the piston 36 is reciprocable, the piston being guided by its enlarged end portion 38 in the bore 34 and by the reduced diameter portion 40 sliding in a bore 42.

Air is supplied to the cylinder 34 from the conduit 24 through a passageway 44 and is controlled by a spring pressed valve 46 seating against a gasket 48. The valve 46 is adapted to be unseated by a plunger 50, having a reduced diameter tip 52 which is arranged to contact with the face of the check valve 46. The plunger 50 is guided in a bore 54 formed in the head 30 and is pressed downwardly by a pin 56, one end of which abuts against the end of the plunger 50 and the other end of which contacts with a lug 58 formed on a trigger 60 which is pivoted at 62 to a handle 64. Upward swinging movement of the trigger 60 is limited by engagement of the end 66 of the trigger with a lug 68 projecting from the handle 64. The handle is connected to the body 28 by a pair of links 70, 72, the lower ends of which are bifurcated and secured to the body by pairs of shouldered studs 74, 76. The upper end of the link 70 is pivotally connected to the handle 64 by a bolt 78, while the upper end of link 72 is pivotally connected to the handle by a pair of shouldered studs 80. The studs 74, 76, 80 and bolt 78 form free pivotal joints, so that the handle 64 may be freely moved relative to the body 28.

The air supplied upon depression of the trigger 60 and consequent opening of the valve 46 flows through the passageway 40 into the cylinder 34. With the piston 36 in the position shown, the air will flow through ports 82 and bore 84 of the piston 36 into the right hand end of the cylinder 34 and force the piston to the left until the ports 82 are covered by the shoulder portion of the body at the bore 42. The piston will, however, continue to move to the left, due to its momentum and due to the expansion of the air in the right hand end of the cylinder 34, until the ports 82 pass beyond the edge of the surface of the bore 42 and permit the air from the cylinder 34 to escape into a chamber 86 which is in free communication with the atmosphere through a relatively large opening 88. As soon as the air within the right hand end of the cylinder is reduced, approaching atmospheric pressure, the air under pressure in the left hand end of the cylinder 34, acting upon the annular surface 90 of the piston 36, will commence forcing the piston 36 to the right until the ports 82 again communicate with the supply of air under pressure, whereupon the air will rush into the right hand end of the cylinder and cushion the return stroke, causing the piston to stop in approximately the position in which it is shown in Fig. 2. This air motor is more fully described and broadly claimed in my Letters Patent No. 1,830,643, granted November 3, 1931.

A high pressure lubricant cylinder 92 is secured in a bore 94 formed in the body 28 by a press fit, the cylinder having a bore 96 and being provided with an inlet port 98 and a vent port 100. A plunger 102 is reciprocable in the cylinder bore 96, the plunger being sealed by a suitable leather hat washer 104 clamped in place by a ring 106 threaded in the end of the cylinder 92 and having its flange held in contact with the plunger 102 by a spring pressed dished washer 108. The plunger 102 has a head 110 formed integrally therewith or formed by a screw threaded therein, the head of the plunger being confined by a sleeve 112 threaded in the end of the piston 36, the sleeve having a shoulder 114 of smaller diameter than that of the head 110. The sleeve 114 and head 110 thus form a lost motion driving connection between the air piston 36 and the plunger 102.

The grease supply pipe 22 is connected to a passageway 116 by a suitable fitting 118, the passageway 116 terminating in a port 120 which is in registry with the inlet port 98 of the cylinder 92.

A pressure reservoir is provided in conjunction with the passageway 116 to aid in maintaining the pressure therein substantially constant. This pressure reservoir comprises a body 122 threaded in a bore 124 and having a cylindrical bore 126 formed therein. A cup leather piston 128 is secured to a stem 130 and pressed upwardly by a compression spring 132. Upward movement of the piston 128 is limited by the engagement of the head 134 of the stem 130 with the end wall 136 of the body 122. Since the reciprocation of the plunger 102 is very rapid, it is necessary that the high pressure cylinder 96 be primed very rapidly. The spring pressed piston 128 aids in accomplishing this result since it permits the lubricant to flow to the booster in a substantially continuous stream, the pressure reservoir serving to store a quantity of lubricant under pressure during the interval that the inlet port 98 of the cylinder 92 is closed by the plunger.

The lubricant is forced from the bore 96 of the cylinder 92 by the plunger 102 past a spring pressed check valve 138, which closes the end of the cylinder bore 96. Thence the lubricant flows through a preferably flexible discharge conduit 140 to a coupler 142, which is provided with a lubricant and spring pressed sealing cup leather 144 adapted to engage the end of a pin fitting 146 illustrated as being threaded in a bearing 148 to be lubricated. The coupling connection between the coupler 142 and pin fitting 146 is made by interengagement of bayonet slots 150 in the coupler with the projecting ends of a pin 152 in the fitting.

When the fitting is connected to a bearing offering high resistance to the reception of lubricant, the pressure in the discharge conduit 140 and in the coupler 142 will build up and force the cup leather 144 firmly against the end of the fitting, so that it is extremely difficult to disconnect the coupler from the fitting without first relieving the lubricant pressure. I have therefore provided automatically operable means for sufficiently relieving the lubricant pressure in the discharge conduit 140 and coupler 142, under such circumstances, to permit the coupler 142 readily to be disconnected from the fitting. This means comprises a bypass including a duct 154 in communication with the discharge conduit 140 and normally closed by a spring pressed check valve 156, and a passageway 158 normally closed during operation of the booster by a valve 160. The valve 160 is formed at the end of a stem 162 which at its opposite end carries a cup leather piston 164 reciprocable in a cylindrical bore 166. A leather hat washer 168, held in place by a threaded annulus 170, forms a seal for the stem 162. The piston 164 is normally pressed to the left by a compression coil spring 172. The end of the cylinder bore 166 is closed by a plug 174 having an inwardly extending portion 176 serving as a stop to limit leftward movement of the piston 164. The left hand end of the cylinder bore 166 is connected with the air passageway 44 by a tube 178. From the above, it will be apparent that when the valve 46 is opened and the booster in operation, the piston 164 will be moved to the right by the air under pressure and the valve 160 held in a position closing the end of the passageway 158.

To permit escape of air from the plunger cylinder 96, an air bleeding vent valve, comprising a seat part 182 having a needle valve part 184, is threaded in the body 28 and is arranged to permit escape of air through the port 100 in the cylinder 92 to the atmosphere. The valve body 182 also serves as a means for aligning the cylinder 92 in the bore 94 of the body 28.

In operation, the tank 10 is filled or partially filled with lubricant, and the hose 12 connected with a source of air under pressure. The valve 14 being opened, the lubricant within the tank 10 is placed under pressure and forced to flow through the pipe 20 to the booster. Opening the valve 14 also permits flow of air to the hose 24. The coupler 142 is then applied to a fitting connected to a bearing to be lubricated and the trigger 60 depressed to open the valve 46. The air flowing into the cylinder bore 34 through the passageway 44 will reciprocate the air piston 36, as previously described, and the latter will at an intermediate point in its forward stroke strike the head 110 of the plunger 102 and force the latter forward. The end of the plunger 102 will not pass the inlet port 98 until after the ports 82 of the piston are in communication with the atmosphere through the chamber 86 and port 88. Thus the actual working portion of the stroke of the plunger 102 will be effected solely by the momentum of the piston 36 and the momentum of the plunger itself. This inertia force is much greater than could be obtained by direct application of air pressure to the piston 36 in the manner customary in fluid operated pumps. As soon as the valve 46 is opened, air under pressure will flow from the passageway 44 through the conduit 178 to the left hand end of the cylinder 166, and force the piston 164 to the right to move the valve 160 to closed position. Thus, lubricant ejected on the operating stroke of the plunger 102 will be forced past the check valve 138 through the conduit 140 into the bearing to be lubricated. The grease or other lubricant supplied through the conduit 22 to the passageway 116 will flow at a substantially continuous rate during the operation of the booster because of the utilization of the pressure reservoir.

During the time that the plunger 102 covers the port 98, the lubricant will flow into the bore 126 of the pressure reservoir body 122, comprising the spring 132. Then upon the retractile stroke of the plunger after it has uncovered the port 98, the spring 132 will expand and aid in forcing a priming charge of lubricant into the cylinder bore 96.

After sufficient lubricant has been supplied to the bearing, the trigger 60 is released, the check valve 46 will be closed by its associated spring, supplemented by the pressure of the air, and force the valve operating plunger 50 and the operating rod 56 upwardly to move the trigger to the position shown in Fig. 2. Upon the closure of the valve 46, the air pressure within the passageway 44 will be rapidly dissipated through operation of the piston 36 and slight leakage from the cylinder bore 34, whereupon the spring 172 will force the piston 164 to the left, removing the valve 160 from its seat. If the bearing to which the coupler is connected is of low resistance, the pressure in the discharge conduit will drop rapidly, so that no difficulty will be experienced in removing the coupler from the fitting. If, however, the bearing offers high resistance to the admission of lubricant, the pressure within the discharge conduit 140 would be maintained and make it difficult to disconnect the coupler from the fitting, were it not for the opening of the valve 160, which permits lubricant to flow past the check valve 156 through the duct 158 into the passageway 116, in which the lubricant is, of course, at relatively low pressure. With the provision of the pressure release valve 160, the pressure within the discharge conduit 140 will drop almost immediately, upon cessation of the booster, approximately to that of the lubricant within the passageway 116. At this low pressure the coupler may be disconnected easily from the fitting.

Since the booster pump operates upon an inertia principle, utilizing the momentum of the moving parts to effect the discharge stroke of the plunger, the booster as a whole is subject to relatively high reactive forces. The reciprocation of the plunger and air piston is extremely rapid, and it would thus be very tiring if it were endeavored to hold the plunger body tightly in the hand while using the apparatus. However, with the provision of the handle 64, which is freely movable relative to the body of the booster, the vibration and shock are not transmitted to the operator's hand to any noticeable extent, and the booster may therefore be used for extended periods without tiring the operator. It will be noted, in this connection, that the trigger for controlling the valve 146 moves with the handle, and that there is an articulated operating connection between the trigger and the valve operating plunger.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. In a high pressure lubricating system, the combination of a source of lubricant under pressure, a pumping mechanism connected to receive lubricant from said source and to discharge it under high pressure, a discharge conduit for connecting said pumping mechanism with a part to be lubricated, power means for operating said pumping mechanism, a valve-controlled by-pass from said discharge conduit to said source, and means controlled by said power means for holding the valve in said by-pass closed while said power means is in operation and opening said valve upon cessation of operation of said power means.

2. A pneumatically operated booster for high pressure lubricating apparatus comprising an air motor, a lubricant ejecting pump operated by said air motor, a manually operable valve controlling the admission of air under pressure to said air motor, a discharge conduit connected to said pump for feeding lubricant to parts to be lubricated, a valve-controlled by-pass for permitting escape of lubricant from said discharge conduit, and air pressure operated means controlled by said manually operable valve for actuating said by-pass valve.

3. In a fluid pressure operated lubricant compressor, the combination of lubricant pumping mechanism, a fluid operated motor to actuate said mechanism, a source of lubricant under low pressure connected to said pumping mechanism, a lubricant discharge conduit having means at its end to make a detachable connection with a lubricant receiving fitting, a duct leading from said discharge conduit to a part of said mechanism receiving lubricant under low pressure from said source, a fluid pressure operated valve in said duct, and a manually operated valve to admit fluid under pressure to said motor and to said fluid pressure operated valve.

4. In a high pressure lubricating system, the combination of a source of lubricant under pressure, a pumping mechanism connected to receive lubricant from said source and to discharge it under pressure, a discharge conduit for connecting said pump with a part to be lubricated, fluid pressure operated means for actuating said pump, a valve-controlled by-pass from said discharge conduit to said source, and fluid pressure operated means for holding the valve in said by-pass closed while said power means is in operation.

5. A pneumatically operated booster for high pressure lubricating apparatus comprising an air motor, a high pressure lubricant ejecting pump operated by said air motor, a manually operable valve controlling the admission of air under pressure to said air motor, a discharge conduit connected to said pump for feeding lubricant to parts to be lubricated, a by-pass conduit for permitting escape of lubricant from said discharge conduit, a valve in said conduit, and air pressure operated means for controlling said last named valve, said means being connected to be supplied with air under pressure upon the opening of said manually operable valve.

6. In lubricating apparatus, the combination of a source of lubricant under relatively low pressure, a high pressure booster operable independently of the pressure of the lubricant from said source and having a cylinder with an inlet port, a lubricant conduit between said source and said booster, and a pressure reservoir associated with said booster and arranged to store lubricant under pressure during the time that the inlet port of the latter is closed and to discharge the lubricant to said cylinder upon opening of said inlet port, said reservoir being of variable effective size and having resilient means opposing the lubricant pressure therein to decrease its size.

7. In high pressure lubricating apparatus, the combination of a source of lubricant under low pressure, a booster operable independently of the pressure of the lubricant from said source and having a high pressure cylinder with an inlet port and plunger reciprocable therein, a conduit to convey lubricant from said source to said booster, and an expansible resilient lubricant reserve chamber located adjacent the inlet port of said booster and receiving lubricant supplied from said source during the intervals that the lubricant is not flowing to the high pressure cylinder of said booster.

8. A portable power operated lubricant compressor, a handle therefor, links pivotally connected to said handle and to said compressor, an element for controlling the operation of said compressor, said element being mounted on said handle, and an articulated connection between said control element and said power means to control the operation of the latter.

9. A portable power operated booster for high pressure lubricating apparatus comprising a body, a pair of links pivotally connected to said body, and a handle for supporting said booster and having its ends pivotally connected to the ends of said links respectively.

10. A manually portable power operated lubricant pumping mechanism, a handle for supporting said mechanism, and means for connecting said mechanism, said handle and means being constructed and arranged to permit substantially free relative movement of said mechanism and said handle.

11. A portable power operated lubricant compressor having rapidly moving parts which tend to vibrate the compressor in opposite directions, a handle for supporting said compressor, and a yielding connection between said compressor and said handle, said connection being arranged to permit substantially free movement of said compressor relative to said handle in said opposite directions.

ERNEST W. DAVIS.